United States Patent
Fujioka et al.

(10) Patent No.: US 6,975,662 B2
(45) Date of Patent: Dec. 13, 2005

(54) CYLINDRICAL STRAIGHT SLAB TYPE GAS LASER

(75) Inventors: Tomoo Fujioka, 642, Isehara 2-chome, Isehara-shi, Kanagawa-ken (JP); Masamori Endoh, Isehara (JP)

(73) Assignee: Tomoo Fujioka, Tokyo (JP)

( * ) Notice: Subject to any disclaimer, the term of this patent is extended or adjusted under 35 U.S.C. 154(b) by 172 days.

(21) Appl. No.: 09/854,190

(22) Filed: May 11, 2001

(65) Prior Publication Data

US 2002/0003828 A1 Jan. 10, 2002

(30) Foreign Application Priority Data

May 19, 2000  (JP) ........................................ 2000-148657

(51) Int. Cl.⁷ ................................................ H01S 3/22
(52) U.S. Cl. .......................................... 372/55; 372/99
(58) Field of Search ............................ 372/55–68, 103, 372/19, 61–66, 93–95, 97–99, 29, 83; 331/94.5

(56) References Cited

U.S. PATENT DOCUMENTS

| | | | | |
|---|---|---|---|---|
| 3,969,687 A | * | 7/1976 | Freiberg et al. | 372/95 |
| 4,050,036 A | * | 9/1977 | Chambers et al. | 372/95 |
| 4,087,763 A | * | 5/1978 | George et al. | 331/94.5 |
| 4,164,366 A | * | 8/1979 | Sziklas et al. | 372/95 |
| 4,514,850 A | * | 4/1985 | Holmes et al. | 372/95 |
| 4,516,244 A | * | 5/1985 | Holmes | 372/99 |
| 4,520,486 A | * | 5/1985 | Lavarini | 372/95 |
| 4,606,036 A | * | 8/1986 | Holmes | 372/95 |
| 4,719,639 A | * | 1/1988 | Tulip | 372/66 |
| 4,744,090 A | * | 5/1988 | Freiberg | 372/94 |
| 4,991,182 A | * | 2/1991 | Logan et al. | 372/94 |
| 5,099,492 A | * | 3/1992 | Zajdman et al. | 372/99 |
| 5,128,953 A | * | 7/1992 | Macken | 372/58 |
| 5,373,525 A | * | 12/1994 | Nowack et al. | 372/64 |
| 5,528,613 A | * | 6/1996 | Macken et al. | 372/37 |
| 5,640,411 A | * | 6/1997 | Bochum et al. | 372/64 |
| 5,661,746 A | * | 8/1997 | Sukhman et al. | 372/83 |
| 5,748,663 A | * | 5/1998 | Chenausky | 372/64 |
| 6,442,187 B1 | * | 8/2002 | Dutov et al. | 372/101 |

FOREIGN PATENT DOCUMENTS

| | | |
|---|---|---|
| DE | 4424726 | 7/1994 |
| JP | 58-22759 | 2/1983 |
| JP | 63-48884 | 3/1988 |
| JP | 3-62579 | 3/1991 |
| JP | 3-71683 | 3/1991 |
| JP | 11-317558 | 11/1999 |

OTHER PUBLICATIONS

Japanese Application No. 2000-148657, May 2000, Fujioka et al.*

* cited by examiner

*Primary Examiner*—Minsun Oh Harvey
*Assistant Examiner*—Tuan N. Nguyen
(74) *Attorney, Agent, or Firm*—Dellett & Walters

(57) ABSTRACT

The present invention provides a slab type gas laser for generating an excellent output laser beam having substantially Gaussian intensity distribution when it is focused by the lens. For this end, a pair of cylindrical electrodes 11, 12 of different diameter are disposed concentrically by way of spacers 13 and laser medium is filled in the gap between the two cylindrical electrodes 11, 12 to define a straight slab 1. Disposed at one end of the straight slab 1 is a ring-shaped trick mirror M1. Also disposed at the center of the one end of the straight slab 1 is an output mirror M2 to pass a part of the light and to reflect a part of the remaining light. On the other hand, disposed at the other end of the straight slab 1 is a w-axicon mirror M3. The relationship between the center offset Xm and the center position X0 of the trick mirror is set to $Xm \leq 1.1\ X0$.

6 Claims, 7 Drawing Sheets

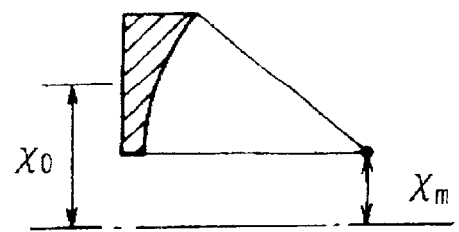
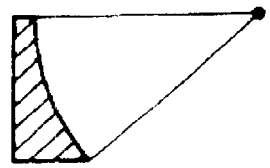
FIG. 5 (a)
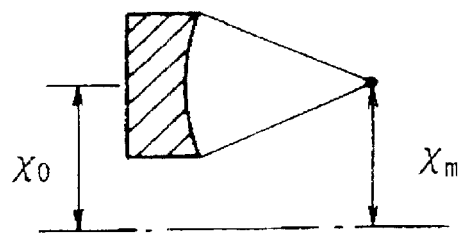
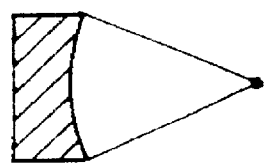
FIG. 5 (b)
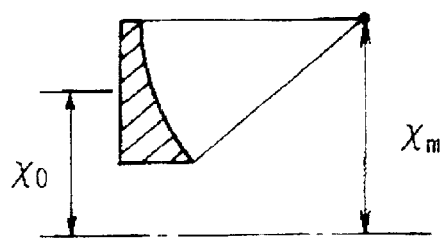
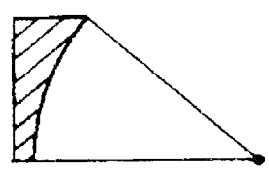
FIG. 5 (c)

(a)

(b)

CYLINDRICAL STRAIGHT SLAB TYPE GAS LASER

BACKGROUND OF THE INVENTION

The present invention relates to a slab type gas laser, more specifically to a construction to provide an excellent laser beam having substantially Gaussian distribution in focused output laser beam profile.

A slab type gas laser is known as one type of gas lasers such as CO2 (carbon dioxide) laser. In a slab type gas laser, the gap between excitation electrodes is narrow so that the excited gas colliding with the electrodes is cooled, thereby accelerating the release of laser lower level. This is the reason why the laser is known as an electrode diffusion cooling type laser.

The slab type gas laser is classified into a waveguide type gas laser and a straight type gas laser depending on the way how the light propagates. In the waveguide type gas laser including a CO2 laser of 10 $\mu$m emission wavelength, the gap between two electrodes is in the order of approximately several m m. The laser beam propagates in the waveguide mode by being reflected between the electrodes in a zigzag manner. On the other hand, in the straight type gas laser, the gap between the electrodes is large enough so that the light can propagate in the free space. As a result, the light propagates between the two electrodes in the free space mode.

A known cylindrical straight slab type gas laser comprises a pair of cylindrical electrodes of different diameter disposed horizontally and concentrically by way of spacers. The gap between the two cylindrical electrodes is filled with laser medium to define a cylindrical straight slab. A ring-shaped trick mirror is disposed at one end of the cylindrical straight slab and an output mirror (half mirror) is disposed at the center of the one end to pass a part of the light and to reflect a part of the remaining light. A w-axicon mirror is disposed at the other end of the cylindrical straight slab.

Also, it is typical in a conventional slab type gas laser employing such cylindrical straight slab to set the center offset of the trick mirror larger than the center position of the mirror itself in order to provide a larger output as described in detail hereinafter.

SUMMARY OF THE INVENTION

In a conventional slab type gas laser employing such cylindrical straight slab does not exhibit preferable Gaussian distribution profile in focused beam intensity without operating the two cylindrical electrodes in accurate concentric relationship. As a result, a plurality of spacers are required to maintain accurate concentric relationship between the two cylindrical electrodes.

Unfortunately, however, the use of such spacers causes split, non-uniform peaks and split, non-uniform beam in a far-sfield image focused by a lens. Any laser beam other than Gaussian distribution profile is impractical for a cutting machine because cutting width and cutting efficiency vary depending on the direction of movement of the beam.

It is, therefore, an object of the present invention to provide a slab type gas laser employing a cylindrical straight slab overcoming the above problems associated with the prior art.

BRIEF DESCRIPTION OF DRAWINGS

Now, the present invention will be described in greater detail by reference to the accompanying drawings, wherein:

FIG. 5 shows 3 kinds of trick mirrors having different center offsets to be used in the slab type gas laser:

DESCRIPTION OF THE PREFERRED EMBODIMENTS

Figure 1:
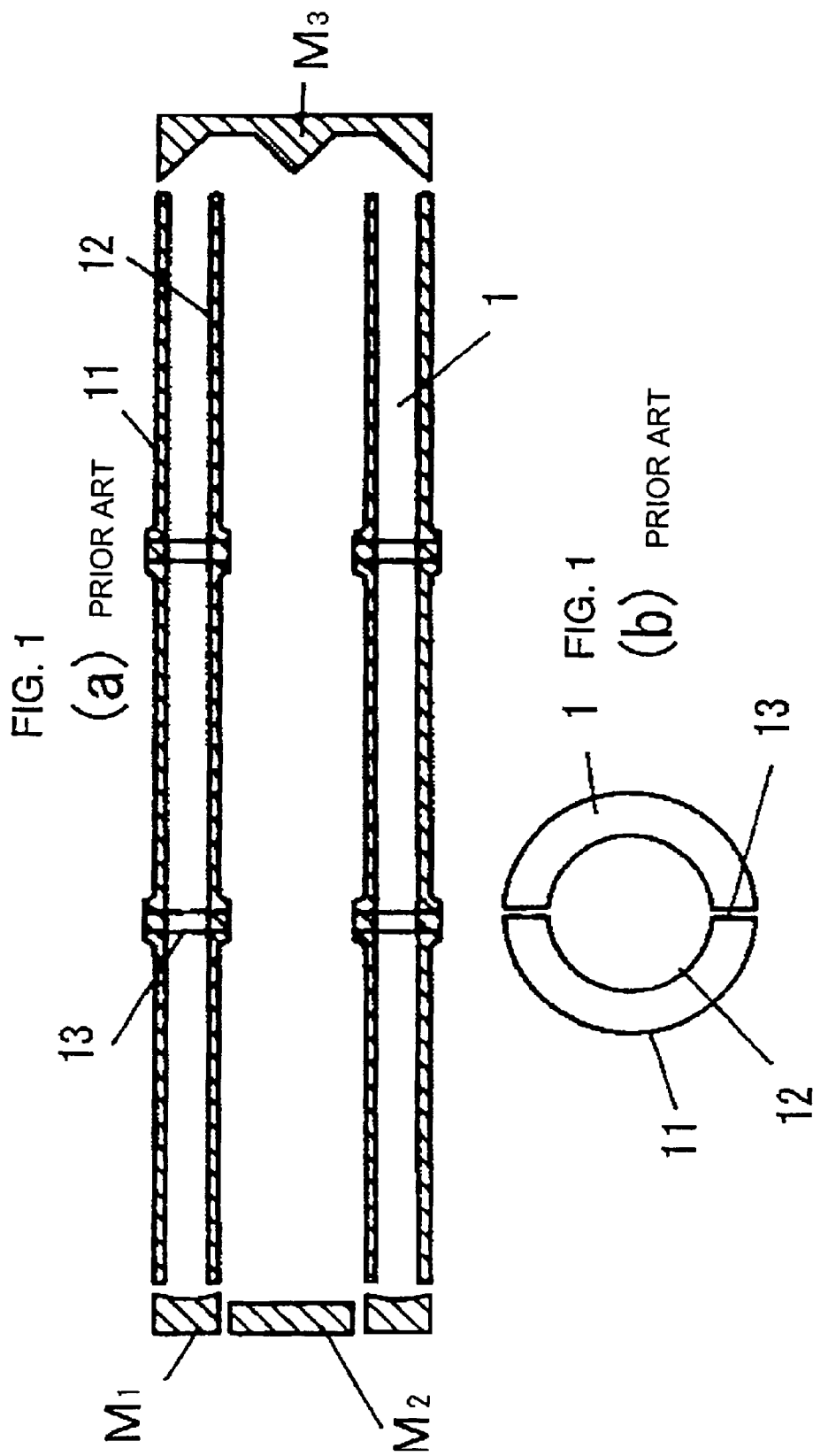
FIG. 1 is a cross section view (A) and a side view (B) of one example of a conventional cylindrical straight slab type gas laser.
Figure 2:
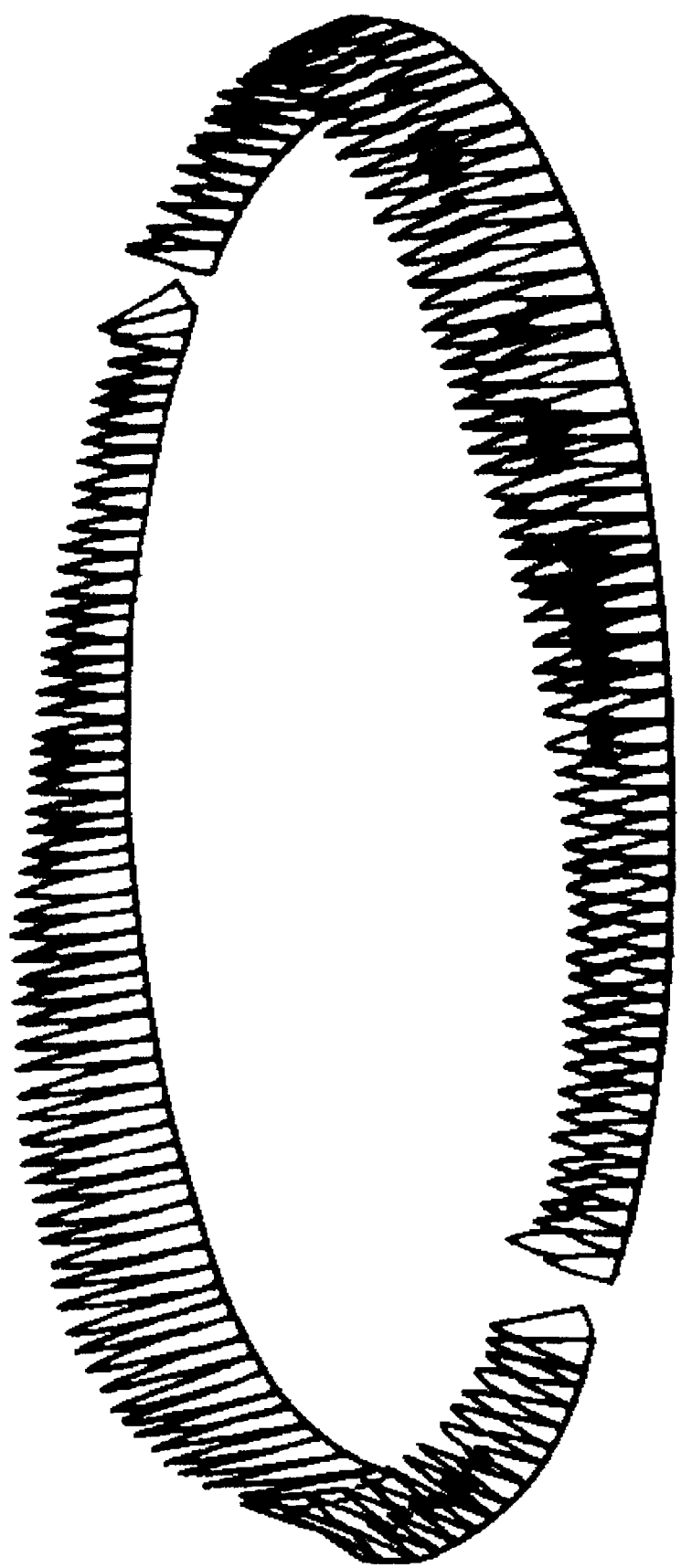
FIG. 2 shows a laser beam intensity distribution at the exit of an output mirror of the gas laser as shown in FIG. 1.
Figure 3:
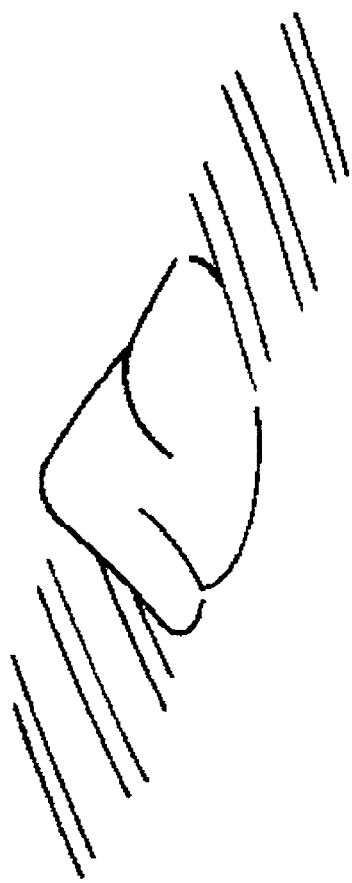
FIG. 3 shows an intensity distribution of a far-field image of the laser beam as shown in FIG. 2 focused by a lens.
Figure 3:

For better understanding of an embodiment of the present invention, a conventional cylindrical straight slab type gas laser will be described first by reference to FIGS. 1–3. FIG. 1(A) is a cross section view and FIG. 1(B) is a side view of a conventional cylindrical straight slab type gas laser. As illustrated in FIG. 1, the cylindrical straight slab type gas laser comprises a pair of concentrically and horizontally disposed cylindrical electrodes 11, 12 of different diameter by way of spacers 13. The gap between the two cylindrical electrodes 11, 12 is filled with laser medium to define a cylindrical straight slab 1. A ring-shaped trick mirror M1 is disposed at one end of the cylindrical straight slab 1. Also disposed at the center of the one end of the cylindrical straight slab 1 is an output mirror (half mirror) M2 to pass a part of the light and to reflect a part of the remaining light. A w-axicon mirror M3 is disposed at the other end of the cylindrical straight slab 1.

As mentioned above, the cylindrical straight slab type gas laser employing the cylindrical straight slab 1 uses the trick mirror M1 as shown in FIG. 5(C) in order to increase the output. That is, the center offset Xm (the distance of the center of curvature from the center axis) of the trick mirror M1 is set larger than the center position X0 (the distance between the midpoint of the width from the center axis) of the trick mirror itself.

Figure 7:
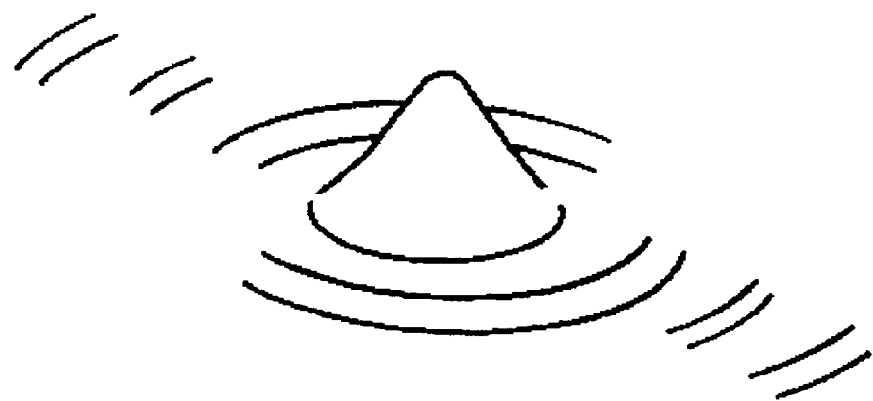
FIG. 7 is intensity distributions of far-field images of the beam as shown in FIG. 6 focused by a lens.
Figure 7:

Such slab type gas laser cannot provide an excellent mode beam having substantially Gaussian intensity distribution at the focused profile as shown in FIGS. 7(A) and (B) and may exhibit non-uniform split beam intensity distributions as shown in FIGS. 3(A) and (B) unless operated with accurate concentric positioning of the two cylindrical electrodes 11, 12. This is the reason why a plurality of spacers 13 are provided between the two cylindrical electrodes 11, 12 as illustrated in side view in FIG. 1(B). However, such spacers 13 cause beam intensity distribution having split peaks and irregular peaks as shown in FIG. 2 at the exit of the output mirror M2. Also, far-field images of the laser beam in this mode focused by a lens are split and non-uniform as illustrated in FIGS. 3(A) and (B).

When the laser beam is used in a cutting machine, any laser beam departing from the Gaussian intensity distribution is impractical because cutting width and efficiency vary depending on the direction of movement of the laser beam.

The above mentioned problem associated with the conventional slab type employing cylindrical straight slab is solved by the cylindrical straight slab type gas laser according to the present invention that comprises two cylindrical electrodes of different diameter disposed concentrically by way of spacers. The gap between the two cylindrical electrodes is filled with laser medium to define a straight slab. A ring-shaped trick mirror is disposed at one end of the straight slab. An output mirror is disposed at the center of the one end of the straight slab to pass a part of the light therethrough while reflecting a part of the remaining light. A w-axicon mirror is disposed at the other end of the straight slab. It features to set the relationship between the center offset Xm of the trick mirror and the center position X0 of the trick mirror itself to Xm≦1.1 X0.

(Preferred Embodiment)

Figure 4:
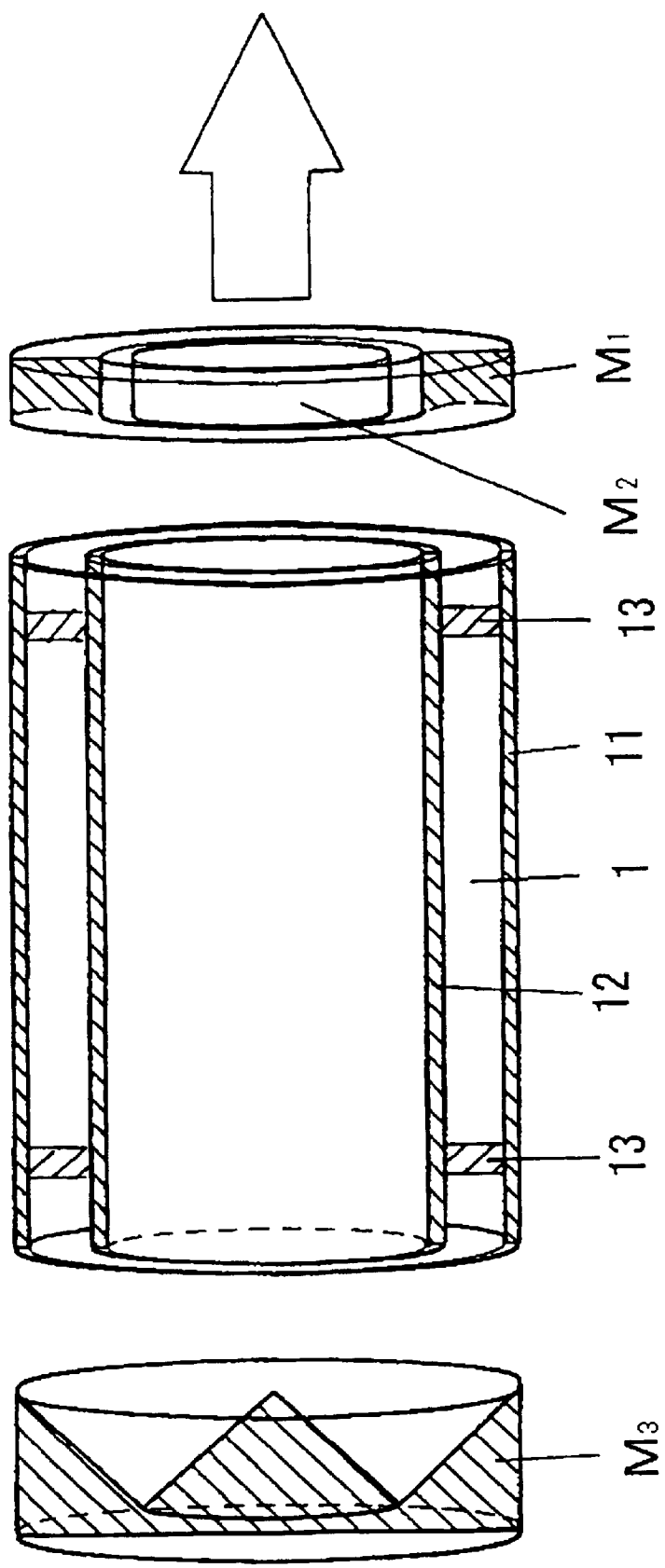
FIG. 4 is a simplified view of a preferred embodiment of the cylindrical straight slab type gas laser according to the present invention.

Now, a preferred embodiment of the present invention will be described hereunder by reference to FIGS. 4–7. Illustrated in FIG. 4 is a simplified construction of the cylindrical straight slab type gas laser according to the present invention. A cylindrical straight slab 1 is defined by a pair of cylindrical electrodes 11, 12 of different diameter laying horizontally and concentrically by way of insulating spacers 13 and filling laser medium in the area defined by the pair of cylindrical electrodes 11, 12. A ring-shaped trick mirror M1 is disposed at one end of the cylindrical straight slab 1 and an output mirror (half mirror) M2 is disposed at the center of the one end of the cylindrical straight slab 1 for passing a part of the light and for reflecting a part of the remaining light. On the other hand, a w-axicon mirror M3 is disposed at the other end of the cylindrical straight slab 1.

When high frequency excitation voltage is applied between the two cylindrical electrodes 11, 12, the gas filled in the cylindrical straight slab 1 is excited and a laser beam is generated by a resonator comprising the three mirrors M1, M2 and M3 to be extracted from the output mirror M2.

Figure 6:
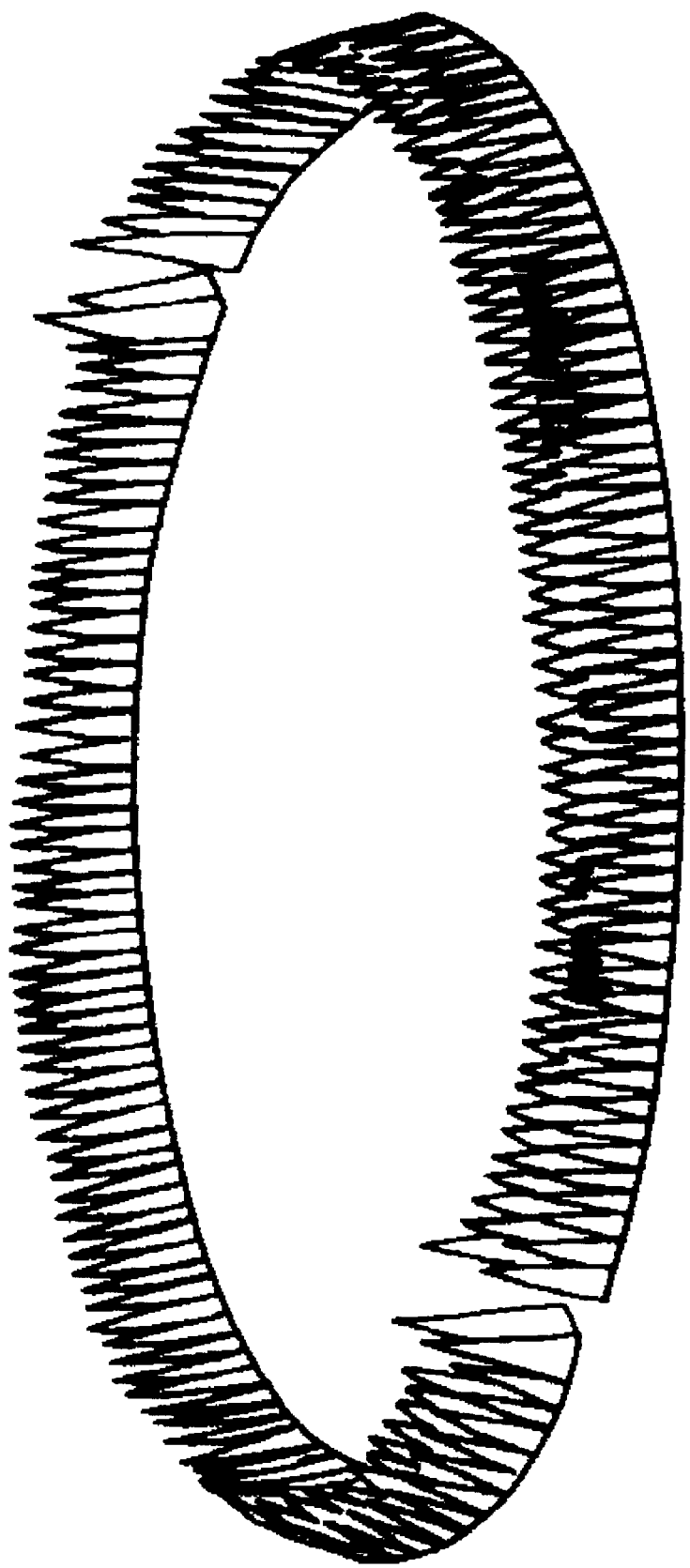
FIG. 6 shows a laser beam intensity distribution at the exit of the output mirror of the gas laser as shown in FIG. 4.

Three kinds of ring-shaped mirrors are prepared as the trick mirror M1. As illustrated in FIGS. 5(A)~(C), they are different in radius of curvature and the center position of the curvature. Experiments are made to verify the relationship between the center offset Xm and the beam quality (closeness to the Gaussian distribution in the beam intensity profile) Q for each mirror. Experiment results prove that the emitted beam is the best when the following relationship between the center offset Xm and the center position X0 of the trick mirror M1 is satisfied Xm≦1.1 X0. That is, the beam at the exit of the output mirror M2 is split due to the use of the spacers 13 but exhibits uniform peaks as shown in FIG. 6. Far-field images of the laser beam in this mode focused by a lens are substantially Gaussian intensity distribution as shown in FIGS. 7(A) and (B).

If the relationship between the center offset Xm and the center position X0 of the trick mirror M1 is set as specified above, there is a slight decrease in the total laser beam output. However, the far-field image of the laser beam focused by a lens provides substantially Gaussian intensity distribution that is useful in terms of cutting width and cutting efficiency when applied to a cutting machine.

As apparent from the above description of the preferred embodiment according to the present invention, the relationship between the center offset Xm and the center position X0 of the trick mirror M1 is set to Xm≦1.1 X0 to provide a uniform beam having substantially Gaussian intensity distribution in the far-field image of the output laser beam focused by a lens even if the spacers 13 are employed.

As a result, the output laser beam is suitable to be applied to a cutting machine.

Although the preferred embodiment of the cylindrical straight slab type gas laser according to the present invention is described herein, it is to be understood that the invention is not limited only to such embodiment and that various modifications can be made by a person having an ordinary skill in the art without departing from the scope and spirit of the present invention.

What is claimed is:

1. A cylindrical straight slab type gas laser comprising:
   a pair of cylindrical electrodes of different diameter disposed concentrically by way of spacers, positioned away from peripheral ends of the pair of cylindrical electrodes, to fill the gap between the cylindrical electrodes with laser medium to define a straight slab;
   a ring-shaped trick mirror disposed at one end of the straight slab;
   an output mirror disposed at the center of the one end of the straight slab to pass part of the light and to reflect a part of the remaining light; and
   a w-axicon mirror disposed at the other end of the straight slab, characterized in that the relationship between the center offset $X_m$ and the center position $X_0$ of the trick mirror is set to $X_0 < X_m = 1.1\ X_0$.

2. A cylindrical straight slab type gas laser of claim 1, wherein the output laser beam from the output mirror has a substantially Gaussian distribution when it is focused by the lens.

3. A cylindrical straight type gas laser of claim 1, wherein the center offset $X_m$ is less than the center position $X_0$.

4. A method of constructing a cylindrical straight type gas laser comprising the steps of:
   arranging pair of cylindrical electrodes of different diameter concentrically to one another by way of spacers, said spacers positioned away from peripheral ends of said pair of cylindrical electrodes;
   arranging a w-axicon mirror at a first end of the cylindrical electrodes;
   arranging an output mirror at a second end of and at the center of the cylindrical electrodes for passing a part of the light from the electrodes and for reflecting a part of the remaining light;
   arranging a ring shaped trick mirror at the second end of and between the cylindrical electrodes;
   filling the space between the cylindrical electrodes with a laser medium;
   increasing the intensity of the light surrounding the spacers which passes between the concentric electrodes thereby providing a substantially Gaussian intensity distribution in a far-field image.

5. A method of constructing a cylindrical straight type gas laser according to claim 4 wherein said step of increasing the intensity is accomplished by using a trick mirror having a relationship between the center offset $X_m$ and the center position $X_0$ being $X_m <= 1.1\ X_0$.

6. A method of constructing a cylindrical straight type gas laser according to claim 5 wherein the center offset $X_m$ is less that the center position $X_0$.

* * * * *